US009920650B2

United States Patent
Hyatt et al.

(10) Patent No.: US 9,920,650 B2
(45) Date of Patent: Mar. 20, 2018

(54) RETENTION OF DAMPING MEDIA

(71) Applicant: United Technologies Corporation, Hartford, CT (US)

(72) Inventors: Thomas B. Hyatt, Cromwell, CT (US); William Richard Ganoe, Jr., Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 395 days.

(21) Appl. No.: 14/620,292

(22) Filed: Feb. 12, 2015

(65) Prior Publication Data

US 2015/0233264 A1    Aug. 20, 2015

Related U.S. Application Data

(60) Provisional application No. 61/939,788, filed on Feb. 14, 2014.

(51) Int. Cl.
  *F01D 25/04* (2006.01)
  *F01D 9/02* (2006.01)

(52) U.S. Cl.
  CPC ............ *F01D 25/04* (2013.01); *F01D 9/02* (2013.01); *F05D 2230/10* (2013.01); *F05D 2230/23* (2013.01); *F05D 2260/96* (2013.01); *F05D 2300/121* (2013.01); *Y10T 29/49231* (2015.01)

(58) Field of Classification Search
  CPC . F01D 25/04; F01D 5/16; F01D 9/041; F01D 25/24; F05D 2220/32; F05D 2230/60; F05D 2240/12; F05D 2260/96; F05D 2300/507; F04D 29/023; F04D 29/542; F04D 29/668; F02K 3/06; Y02T 50/672
  See application file for complete search history.

(56) References Cited

U.S. PATENT DOCUMENTS

| | | |
|---|---|---|
| 2,862,686 A | 12/1958 | Bartlett |
| 5,056,738 A | 10/1991 | Mercer et al. |
| 5,141,400 A | 8/1992 | Murphy et al. |
| 5,498,137 A | 3/1996 | El-Aini et al. |
| 5,725,355 A | 3/1998 | Crall et al. |
| 5,947,688 A | 9/1999 | Schilling et al. |
| 6,033,186 A | 3/2000 | Schilling et al. |
| 6,039,542 A | 3/2000 | Schilling et al. |
| 6,669,447 B2 | 12/2003 | Norris et al. |
| 6,979,180 B2 | 12/2005 | Motherwell |
| 7,112,044 B2 | 9/2006 | Whitehead et al. |
| 7,980,813 B2 | 7/2011 | Medynski et al. |

(Continued)

FOREIGN PATENT DOCUMENTS

| | | |
|---|---|---|
| EP | 1566519 | 8/2005 |
| WO | 20140143874 | 9/2014 |

OTHER PUBLICATIONS

U.S. Appl. No. 61/798,351, filed Mar. 15, 2013.

(Continued)

*Primary Examiner* — William McCalister
(74) *Attorney, Agent, or Firm* — Carlson, Gaskey & Olds P.C.

(57) ABSTRACT

An example method of assembling a particle damped gas turbine engine component according to an exemplary aspect of the present disclosure includes, among other things, holding damping media within a cavity of a gas turbine engine component using magnetic force.

17 Claims, 5 Drawing Sheets

(56) References Cited

U.S. PATENT DOCUMENTS

2010/0209235 A1    8/2010  Shim et al.
2010/0329847 A1  12/2010  Yamashita et al.
2011/0211965 A1    9/2011  Deal et al.
2016/0333710 A1* 11/2016  Klinetob ................. F01D 25/06

OTHER PUBLICATIONS

Extended European Search Report for Application No. 15155055.5 dated Dec. 8, 2015.
European Search Report for Application No. 15155055.5 dated Jun. 11, 2015.

* cited by examiner

RETENTION OF DAMPING MEDIA

CROSS-REFERENCE TO RELATED APPLICATION

This application claims priority to U.S. Provisional Application No. 61/939,788 filed on Feb. 14, 2014.

BACKGROUND

This disclosure relates generally to structural guide vanes (SGVs) and, more particularly, to assembling SGVs having damping media.

Gas turbine engines can use SGVs to control and guide the flow of air through the engine. SGVs can also support some engine components. In some example engines, SGVs are axially aft the fan of the aircraft engine. Other SGVs may be located in the compressor stages, the turbine stages, or other areas of the aircraft engines.

SGVs and other airfoils can be prone to undesirable vibration during operation of the gas turbine engine. Particle damping has been used to suppress vibratory resonance experienced by SGVs.

SUMMARY

A method of assembling a particle damped gas turbine engine component according to an exemplary aspect of the present disclosure includes, among other things, holding damping media within a cavity of a gas turbine engine component using magnetic force.

In a further embodiment of the foregoing method, the method includes holding the damping media within the cavity of a structural guide vane.

In a further embodiment of any of the foregoing methods, the method includes covering the cavity with a cover during the holding.

In a further embodiment of any of the foregoing methods, the method includes bonding the cover to the cavity and removing the magnetic force.

In a further embodiment of any of the foregoing methods, the method includes aligning magnetic fields to pass through the cavity and hold damping media within the cavity.

In a further embodiment of any of the foregoing methods, the damping media is free to move within the cavity after the bonding.

In a further embodiment of any of the foregoing methods, the damping media comprises shot peen media.

In a further embodiment of any of the foregoing methods, an electromagnet selectively provides the magnetic force.

In a further embodiment of any of the foregoing methods, the method includes aligning a first pole adjacent a first side wall of the cavity and an opposing, second pole of the magnet adjacent an opposing, second side wall of the cavity.

A structural guide vane according to an exemplary aspect of the present disclosure includes, among other things, a radially outer platform, a radially inner platform, a vane body located between the radially outer platform and the radially inner platform, and a vane cover. The vane body includes one or more cavities. A vibration damping material filling the cavities is in direct contact with the vane body, the vane cover, or both.

In further embodiment of the foregoing structural guide vane, the vibration damping material is shot peen media.

In further embodiment of the foregoing structural guide vane, the cavities are formed on a side wall of the vane body.

In a further embodiment of any of the foregoing structural guide vanes, the cavity is void of any container holding the vibration damping material.

In a further embodiment of any of the foregoing structural guide vanes, the vane cover is adhesively bonded within a recessed area of the vane body.

In a further embodiment of any of the foregoing structural guide vanes, the cavities are formed within the recessed area.

In a further embodiment of any of the foregoing structural guide vanes, the vane body is aluminum.

In a further embodiment of any of the foregoing structural guide vanes, wherein the vane cover is bonded to the vane body over the one or more cavities.

DETAILED DESCRIPTION

Figure 1:
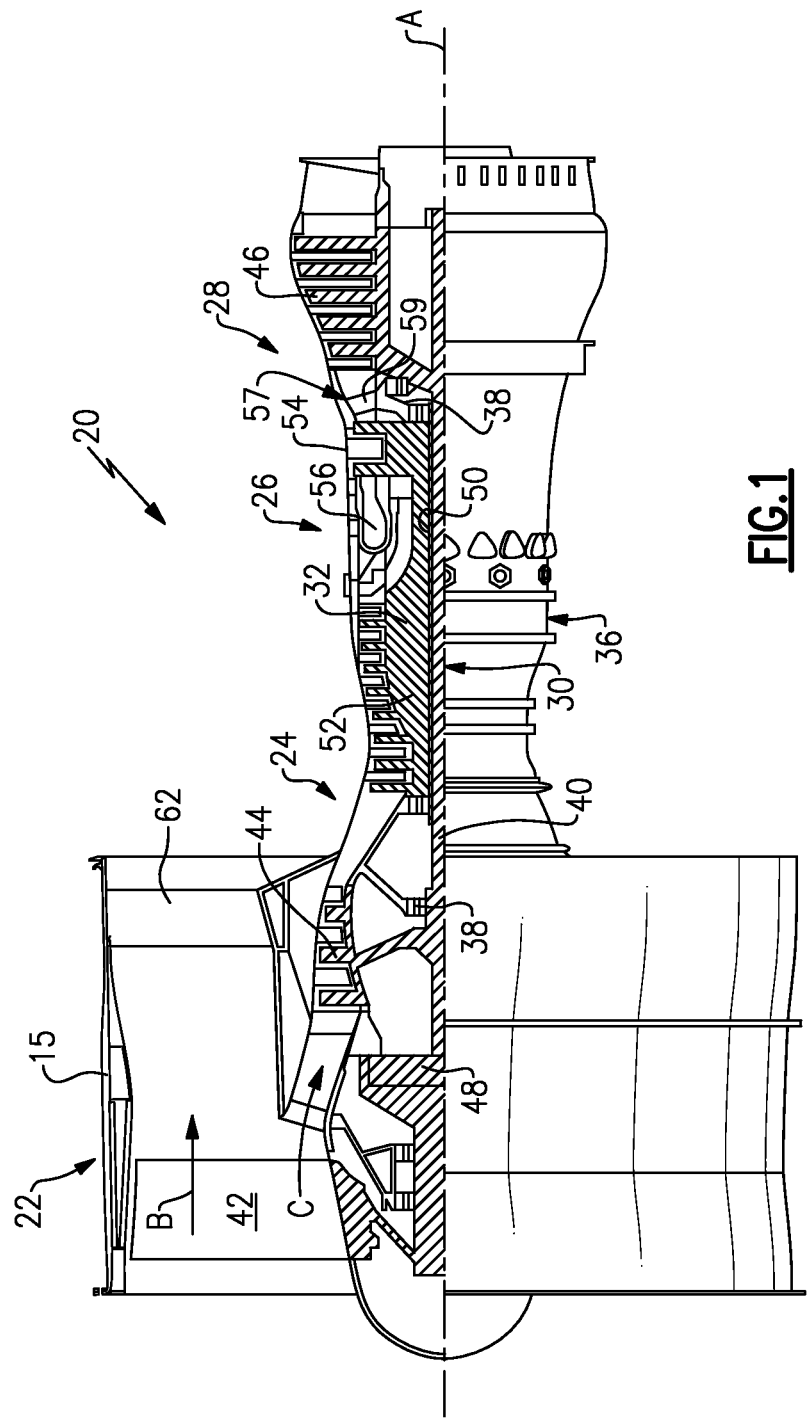
FIG. 1 illustrates a schematic, cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 feet/second (350.5 meters/second).

Figure 2:
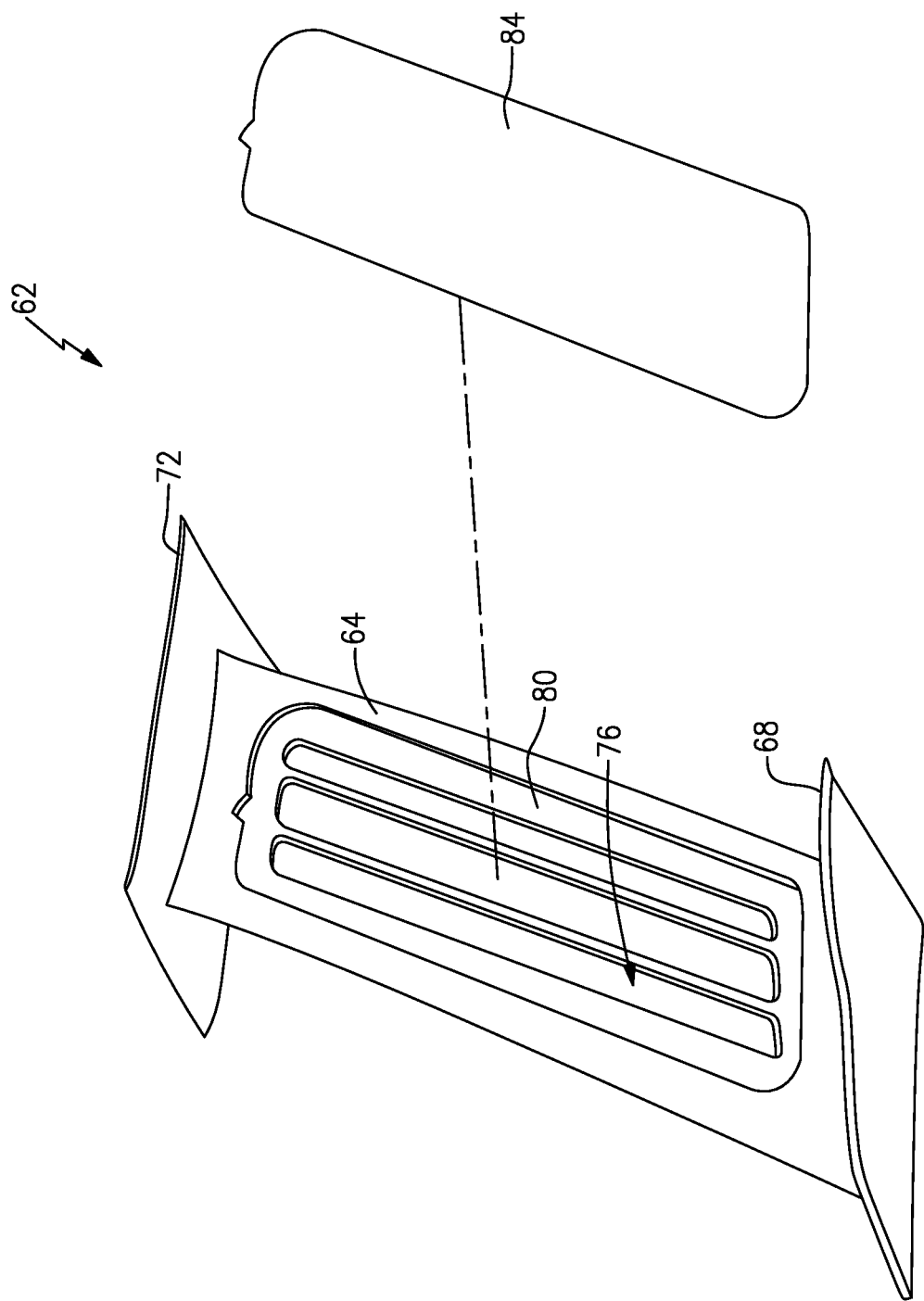
FIG. 2 illustrates an exploded view of an example structural guide vane (SGV).

Referring now to FIG. 2 with continuing reference to FIG. 1, at a position aft the fan 42, the engine 20 includes a structural guide vane (SGV) 62. The structural guide vanes 62 steers flow from the fan 42. The SGV 62 also supports components of the engine 20 near the fan 42. The SGV 62 is within an array of SGVs circumferentially distributed about the axis A.

The SGV 62 includes a vane body 64 extending from a radially inner platform 68 to a radially outer platform 72. In an installed position within the engine 20, the radially inner platform 68 mounts to an inner hub of the engine 20. The radially outer platform 72 mounts to an outer fan case of the engine 20.

The vane body 64 includes a plurality of cavities 76. In the example embodiment, the cavities 76 are approximately rectangular in shape. The number and location of the cavities 76 may vary depending on the application. Cavities 76 may be formed on one or both sides of the SGV 62 depending on the circumferential depth of the SGV 62 and the depth of the cavities 76. The cavities 76 could also be formed in the radially inner platform 68 or radially outer platform 72.

The cavities 76 are formed within a recessed area 80 of the vane body 64. The recessed area 80 receives a vane body cover 84 when the SGV 62 is assembled. Vibration damping of the SGV 62 is provided by damping media placed within the cavity 76. The vane cover 84 is adhesively secured to the recessed area 80 to hold the damping media within the cavities 76. Notably, in this example, the damping media is not held within any container. The damping media is in direct contact with the vane body 64 and the vane body cover 84.

Placing damping media within the cavities 76, and then placing the cover 84 within the recessed area 80 without disturbing the damping media, can be challenging. Example embodiments of this disclosure hold damping media within the cavities 76 during assembly using magnet fields to reduce these difficulties.

Figure 3:
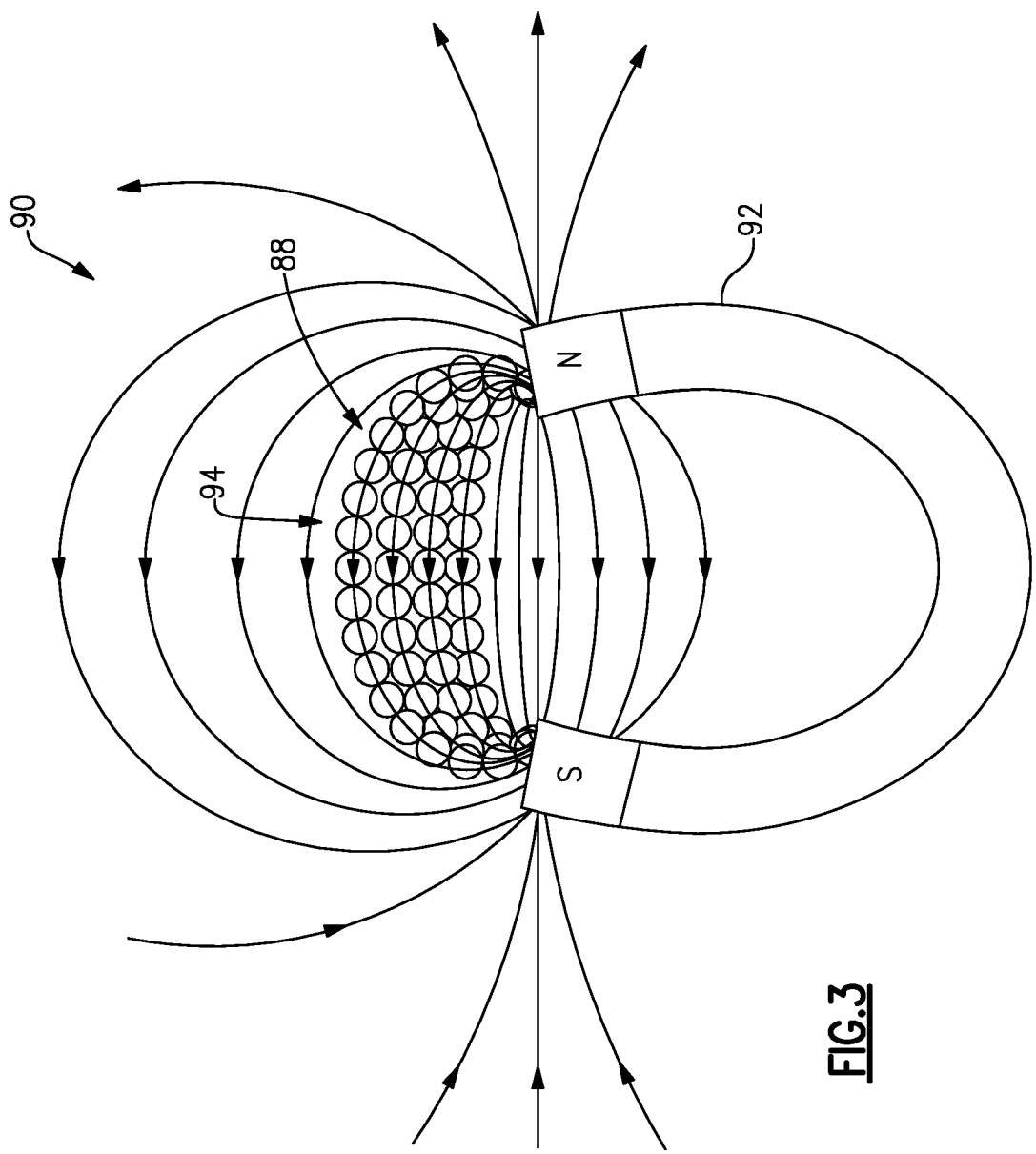
FIG. 3 illustrates a highly schematic view of damping media aligning along lines of a magnetic field.

Referring to FIG. 3, damping media 88 that is magnetic orients along magnetic field lines 90 when positioned near a magnet 92. When oriented in this way, the damping media 88 has the arcing strands 94 following, generally, the paths of the magnetic field lines 90.

Figure 4:
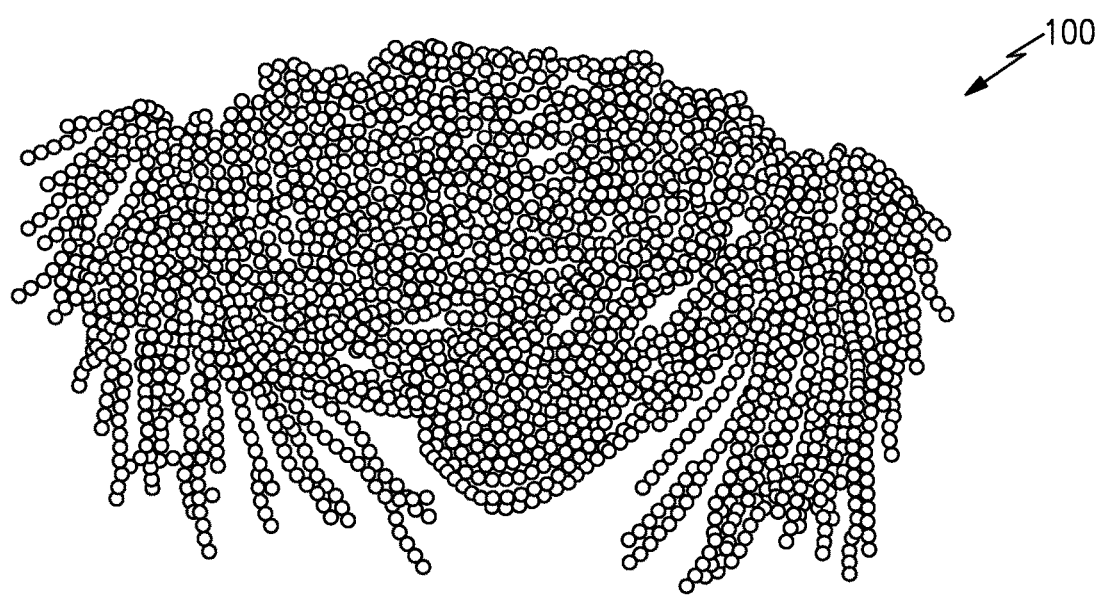
FIG. 4 illustrates a shot peen media type of damping media aligning within a magnetic field.

An example damping media 88 for placement within the cavities 76 is shot peen media 100 or bearing balls as shown in FIG. 4. Other example damping media includes sand, damping tape, ceramic particles, bearing balls, etc.

The example shot peen media is stainless steel in this example. The shot peen media is cold formed and are magnetic. Shot peen media are not intrinsically ferromagnetic, but, in this example, by virtue of being subject to high amounts of cold work, sufficient grain alignment is achieved to behave like a ferromagnetic material. The shot peen media 100 is positioned within a magnetic field and are oriented in arcing strands.

Figure 5:
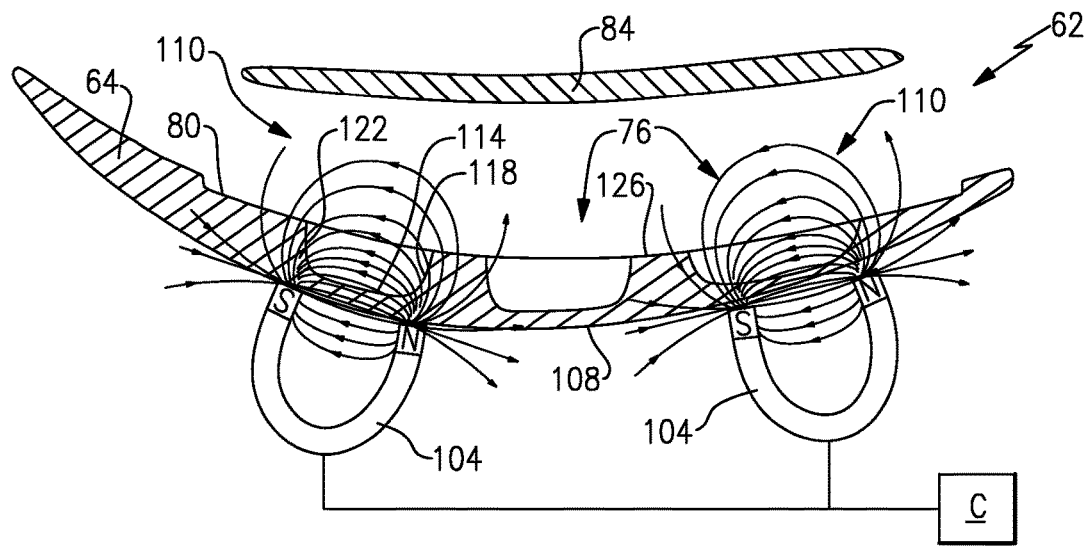
FIG. 5 illustrates a section view of the SGV of FIG. 2 during assembly.
Figure 6:
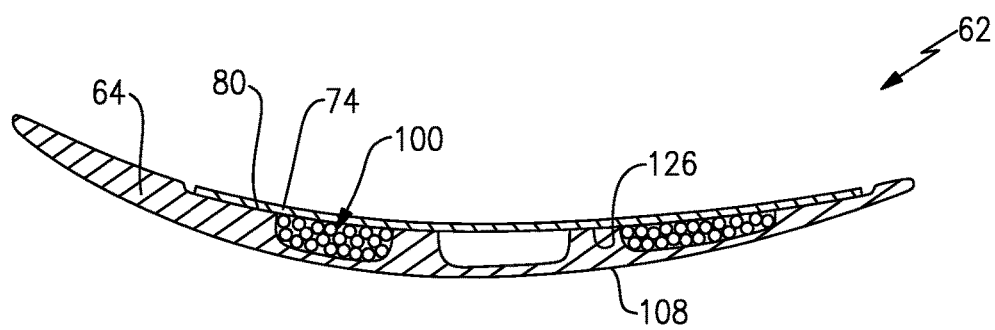
FIG. 6 illustrates a section view of the SGV of FIG. 2 when assembled.

Referring now to FIGS. 5 and 6, magnets 104 are used to hold shot peen media 100 within the cavities 76 before the vane cover 84 is secured. The tendency of the shot peen media 100 to align in arcing strands along magnetic field lines facilitates holding the shot peen media 100 within the cavities 76.

In this example, when the shot peen media 100 are loaded into the cavities 76, magnets 104 are positioned along a surface 108 of the vane body opposite the cavities 76. The example magnets 104 are electromagnets that selectively induce magnetic fields 110 in response to a command from a controller C. The magnets 104 may be held within a fixture (not shown) that supports the vane body 64.

Generally, the example magnets 104 are aligned such that the magnetic fields 110 that enter the cavities 76 through a side of the floor 114 of the cavity 76 extend continuously to exit the cavity 76 through another side of the floor 114. Also, the magnetic fields 110 that enter the cavity 76 through a side wall 118 of the cavity 76 extend continuously to exit the cavity 76 through the opposing side wall 122.

The magnetic force from the magnets 104 pulls the shot peen media 100 into the cavities 76. The orientation of the flow fields 110 encourages the shot peen media 100 to orient themselves in strands within the cavities 76 along the magnetic fields 110.

Alignment along the flow fields 110 helps to ensure that the shot peen media 100 do not extend out of the cavities 76 to interfere with a bond line 126 between the cover 84 and the vane body 64. The alignment of the magnetic fields 110 encourages strands of the shot peen media 100 that start within the cavities 76 to also stop within the cavities 76 rather than interfering with the bond line 126.

To encourage the magnetic fields 110 to align in this way, the magnets 104 have a first pole adjacent the side wall 118 and an opposing, second pole adjacent the side wall 122.

With no shot peen media 100 interfering with the bond line 126, the cover 84 can then be adhesively secured within the recessed area 80 to the vane body 64 to hold the shot peen media 100 within the cavities 76. The magnets 104 are removed or demagnetized after the cover 84 is secured. The shot peen media 100 are then held within the cavities 76 by the cover 84. The shot peen media 100 directly contact the cover 84, the floor 114, the side walls 118, 122. The shot peen media 100 are free to move within the cavities 76 without interference from any separate container.

Vibration damping of the SGV 62 can be influenced by the amount of shot peen media 100 within the cavities 76. Notably, the example method enables filling the cavities 76 with the shot peen media 100 without requiring a separate container within the cavities 76 holding the shot peen media 100. This maximizes damping area within a given area of the cavities 76. If containers were required, the container would occupy at least some of the space of the cavities 76.

In addition to the selection and placement of the damping material, which is the shot peen media 100 in this example, various types of materials may be utilized to form the vane body 64 and the cover 84. In some examples, these components are formed of the same material, such as aluminum or organic matrix composite. In other examples, the vane body 64 and the cover 84 are formed of different materials to vary performance parameters of the SGV 62, such as weight, stiffness, or both.

The example damping is described with reference to the SGV 62. Similar techniques of magnetic retention of damping media could be used in connection with other components, such as other airfoil components of the engine 20 (FIG. 1) like vanes.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

Although embodiments of this invention have been disclosed, a worker of ordinary skill in the art would recognize that certain modifications would come within the scope of this invention. For that reason, the following claims should be studied to determine the true scope and content of this invention.

We claim:
1. A method of assembling a particle damped gas turbine engine component, comprising:
holding damping media within a cavity of a gas turbine engine component using magnetic force, including covering the cavity with a cover during the holding.
2. The method of claim 1, including holding the damping media within the cavity of a structural guide vane.
3. The method of claim 1, including bonding the cover to the cavity and removing the magnetic force.
4. The method of claim 3, wherein the damping media is free to move within the cavity after the bonding.
5. The method of claim 1, including aligning magnetic fields to pass through the cavity and hold the damping media within the cavity.
6. The method of claim 1, wherein the damping media comprises shot peen media.
7. The method of claim 1, wherein an electromagnet selectively provides the magnetic force.
8. The method of claim 1, including aligning a first pole adjacent a first side wall of the cavity and an opposing, second pole of the magnet adjacent an opposing, second side wall of the cavity.
9. The method of claim 2, wherein the vane includes a vane body extending between a first platform and a second platform, and the cavity is formed on and extends inwardly from a side of the vane body.
10. The method of claim 9, comprising:
bonding the cover to the cavity and removing the magnetic force;
aligning magnetic fields to pass through the cavity and hold the damping media within the cavity; and
wherein the damping media is free to move within the cavity after the bonding.
11. The method of claim 10, wherein the damping media comprises shot peen media.
12. The method of claim 11, comprising aligning a first pole adjacent a first side wall of the cavity and an opposing, second pole of the magnet adjacent an opposing, second side wall of the cavity, wherein an electromagnet selectively provides the magnetic force.
13. A method of assembling a particle damped gas turbine engine component, comprising:
holding damping media within a cavity of a gas turbine engine component using magnetic force, covering the cavity with a cover during the holding, wherein the gas turbine engine component is a vane.
14. The method of claim 13, wherein the vane is a structural guide vane including a vane body extending between a first platform and a second platform, and the cavity is a plurality of cavities formed on at least one side of the vane body.
15. The method of claim 13,
comprising: aligning
magnetic fields to pass through the cavity and hold the damping media within the cavity; and
wherein the damping media is free to move within the cavity after the cover is secured to the component and the magnetic force is removed.
16. The method of claim 15, wherein the vane is a structural guide vane including a vane body extending between a first platform and a second platform, and the cavity is a plurality of cavities formed on at least one side of the vane body.
17. The method of claim 16, comprising:
bonding the cover to the cavity and removing the magnetic force;

wherein the step of aligning includes aligning a first pole adjacent a first side wall of the cavity and an opposing, second pole of the magnet adjacent an opposing, second side wall of the cavity;

wherein the damping media comprises shot peen media;

wherein the cavity is void of any container holding the vibration damping material; and wherein the damping media directly contacts at least one of the vane body and the cover subsequent to the step of bonding.

* * * * *